(12) United States Patent
Rembach et al.

(10) Patent No.: US 9,000,907 B1
(45) Date of Patent: Apr. 7, 2015

(54) SAFETY SYSTEM FOR ALERTING AN OPERATOR OF A PARKED VEHICLE THAT AN OCCUPANT IS STILL PRESENT IN THE PARKED VEHICLE

(71) Applicants: Paul F. Rembach, Cypress, TX (US); Don Leslie Bockhorn, Houston, TX (US)

(72) Inventors: Paul F. Rembach, Cypress, TX (US); Don Leslie Bockhorn, Houston, TX (US)

( * ) Notice: Subject to any disclaimer, the term of this patent is extended or adjusted under 35 U.S.C. 154(b) by 0 days.

(21) Appl. No.: 14/494,564

(22) Filed: Sep. 23, 2014

(51) Int. Cl.
| | |
|---|---|
| *B60Q 1/00* | (2006.01) |
| *G08B 13/22* | (2006.01) |
| *B60N 2/00* | (2006.01) |
| *G08B 3/10* | (2006.01) |
| *G08B 5/38* | (2006.01) |
| *H04W 4/22* | (2009.01) |

(52) U.S. Cl.
CPC ............. *G08B 13/22* (2013.01); *B60N 2/002* (2013.01); *G08B 3/10* (2013.01); *G08B 5/38* (2013.01); *H04W 4/22* (2013.01)

(58) Field of Classification Search
CPC ............ G08B 13/22; G08B 3/10; G08B 5/38; B60N 2/002; H04W 4/22
USPC ........... 340/457, 565, 573.1, 573.4, 667, 522, 340/425.5, 426.28, 426.3, 428, 438, 439, 340/461, 666, 686.1; 180/271, 273, 290; 200/85 A; 307/9.1, 10.1
See application file for complete search history.

(56) References Cited

U.S. PATENT DOCUMENTS

| | | | |
|---|---|---|---|
| 6,922,147 B1 * | 7/2005 | Viksnins et al. ........... | 340/573.1 |
| 7,012,533 B2 * | 3/2006 | Younse ...................... | 340/573.1 |
| 7,170,401 B1 * | 1/2007 | Cole ............................. | 340/457 |
| 2005/0024188 A1 * | 2/2005 | Sider .......................... | 340/425.5 |
| 2012/0232749 A1 * | 9/2012 | Schoenberg et al. ........... | 701/36 |

FOREIGN PATENT DOCUMENTS

EP          1745986 A1      1/2007

* cited by examiner

*Primary Examiner* — Anh V La
(74) *Attorney, Agent, or Firm* — Buskop Law Group, PC; Wendy Buskop

(57) ABSTRACT

A safety system using a network connected to a vehicle to alert a client device of an operator, a first responder, a dedicated emergency dispatch service, a bystander or combinations thereof to the presence of an occupant in a vehicle passenger compartment of a vehicle indicating the occupant's temperature has exceeded or dropped below a life threatening threshold. The system uses a plurality of pressure sensors in vehicle seats, a first plurality of optical infrared frequency sensors located in the passenger compartment for measuring air temperature values of the passenger compartment, a plurality of second optical infrared frequency sensors measuring occupant temperature values in the passenger compartment and, in embodiments, at least one front seat motion sensor and at least one back seat motion sensor.

18 Claims, 4 Drawing Sheets

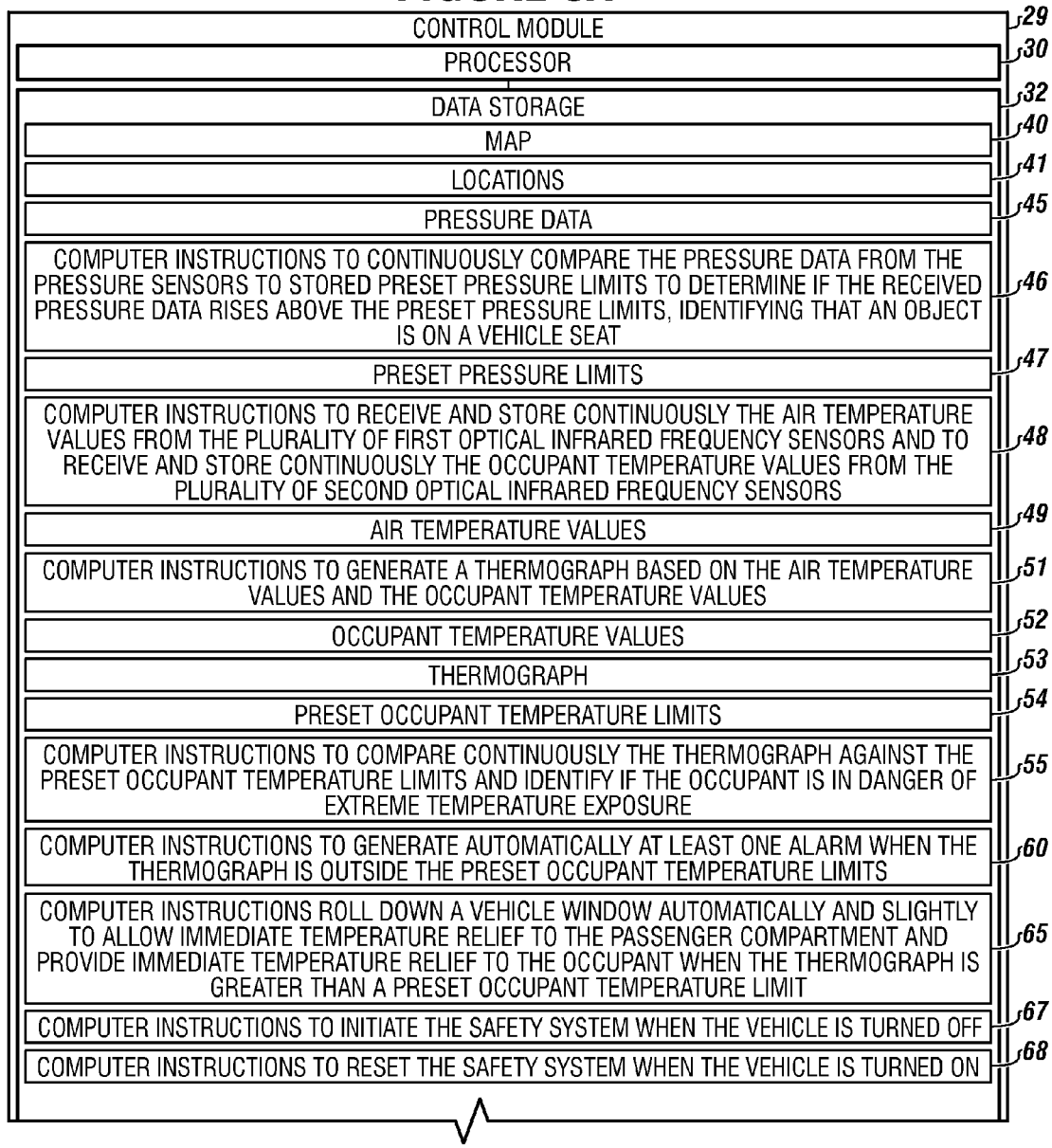

SAFETY SYSTEM FOR ALERTING AN OPERATOR OF A PARKED VEHICLE THAT AN OCCUPANT IS STILL PRESENT IN THE PARKED VEHICLE

FIELD

The present embodiments generally relate to safety systems for detecting and alerting the presence of an occupant endangered by or exposed to extreme temperatures.

BACKGROUND

Every year too many infants, children, elderly people, handicapped people, disabled people and pets are injured and/or die due to extreme temperature exposure, such as heat stroke or hypothermia, from being intentionally or unintentionally left or being trapped by playing inside the passenger compartment of a vehicle.

A child's body temperature increases three to five times faster than an adult's and children are not able to dissipate heat as efficiently as adults. Heatstroke occurs when the body core temperature reaches 104 degrees Fahrenheit, wherein a body core temperature of 107 degrees Fahrenheit is considered lethal. The results can include permanent organ damage and death. Research and real world incidents have shown that on a warm, sunny day, even at mild temperatures, such as 65 degrees Fahrenheit, the temperature in a closed vehicle can rise to dangerous, lethal temperatures in just a few minutes.

Just as with people, heat stroke in pets can cause nausea, loss of consciousness, irreparable brain damage and death. Pets, more so than humans, are susceptible to overheating or freezing.

Dogs, for example, are designed to conserve heat. Their sweat glands, which exist on their nose and the pads of their feet, are inadequate for cooling during hot days. Panting and drinking water helps cool them, but if they only have overheated air to breathe, dogs can suffer brain damage and organ damage after just fifteen minutes. Further, if a dog is accustomed to being inside, it is more prone to heatstroke.

Federal and state authorities have enacted laws to protect elderly people and children in motor vehicles, i.e. Federal Motor Vehicle Standard 213. Children under a specified age may not be left unattended in a motor vehicle. Further, all states of the United States and the District of Columbia have enacted child restraint laws. Additionally, all children below a specified age and weight, when riding in a motor vehicle, must ride in an approved child safety seat.

A need exists for a safety system that can detect and alert the presence of an occupant in a parked vehicle that is in danger of extreme temperature exposure.

The present embodiments meet these needs.

BRIEF DESCRIPTION OF THE DRAWINGS

The detailed description will be better understood in conjunction with the accompanying drawings as follows:

FIGS. 3A-3B depict a diagram of a control module according to one or more embodiments.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The embodiments relate to a safety system using a network connected to a vehicle to alert at least one of: a client device of an operator, a first responder, a dedicated emergency dispatch service, a bystander, or combinations thereof to the presence of an occupant in a vehicle passenger compartment indicating the occupant's temperature has exceeded or dropped below a life threatening threshold.

The system can use a plurality of pressure sensors in vehicle seats, a plurality of first optical infrared frequency sensors located in the passenger compartment for measuring air temperature values of the vehicle passenger compartment, a plurality of second optical infrared frequency sensors for measuring occupant temperature values in the vehicle passenger compartment and, in embodiments, at least one front seat motion sensor and at least one back seat motion sensor.

This present embodiments can save the lives of family members in danger of severe cold and severe heat, when these circumstances exist.

The present embodiments notify others, both in the immediate area and remotely, of the condition and the vehicle will try to correct temperature by either removing heat or bringing heat into the vehicle.

The present embodiments help prevent inattentive parents from going to jail for leaving their child in the vehicle when it is too hot.

The present embodiments help law enforcement validate that someone has improperly exposed a child, handicapped person, elderly person or pet to a life threatening situation.

The present embodiments relate to safety systems for alerting an operator of a parked vehicle if an occupant is still present in the parked vehicle. The embodied systems can include one or more pressure sensors, which in embodiments can be digital. Each pressure sensor can be located in a vehicle seat, such as centrally on the vehicle seat. Each pressure sensor can be adapted to detect weight of the occupant in the vehicle seat, thereby identifying whether an occupant is still in the parked vehicle.

Figure 1:
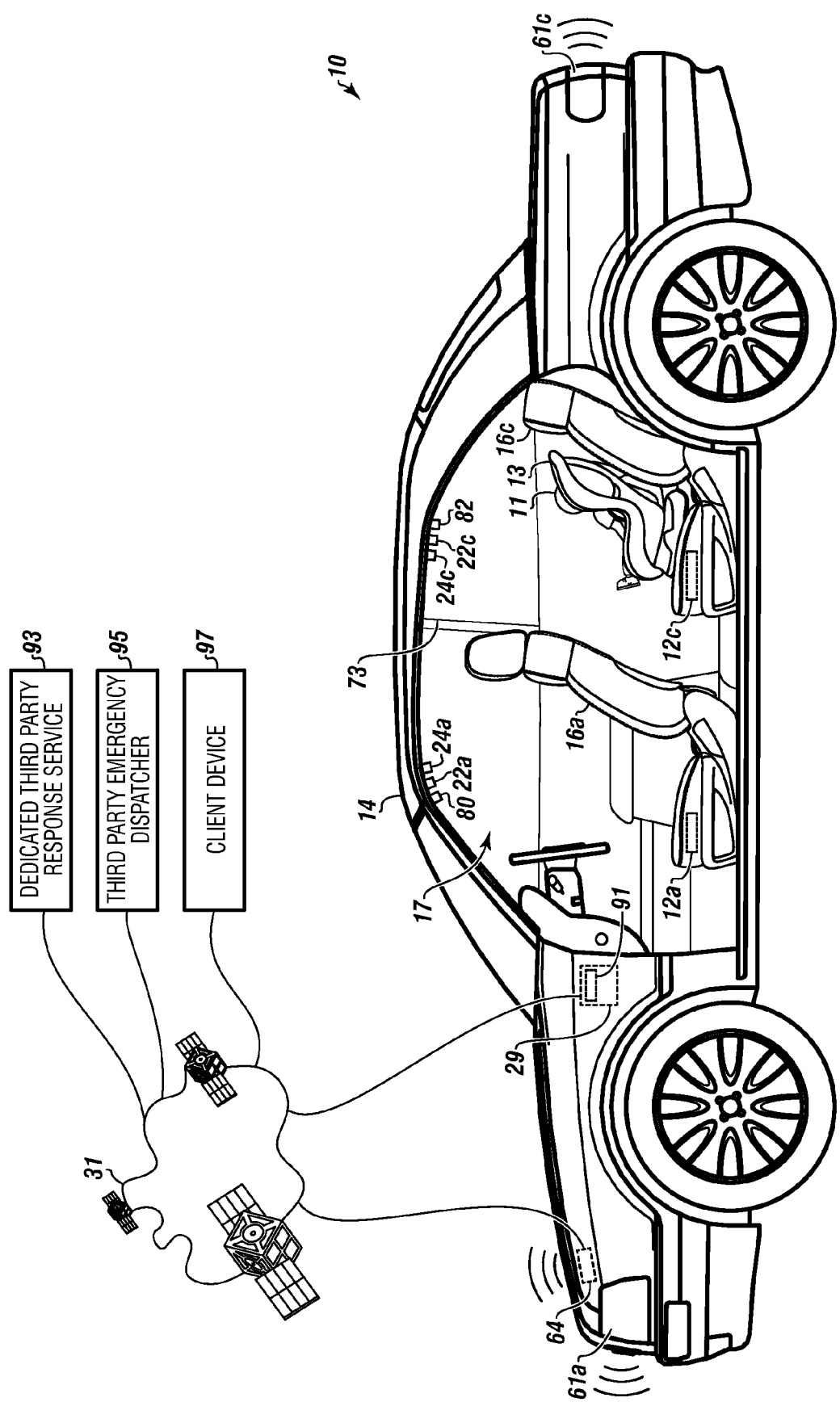
FIG. 1 depicts a side view of of the safety system installed in a vehicle according to one or more embodiments.
Figure 2:
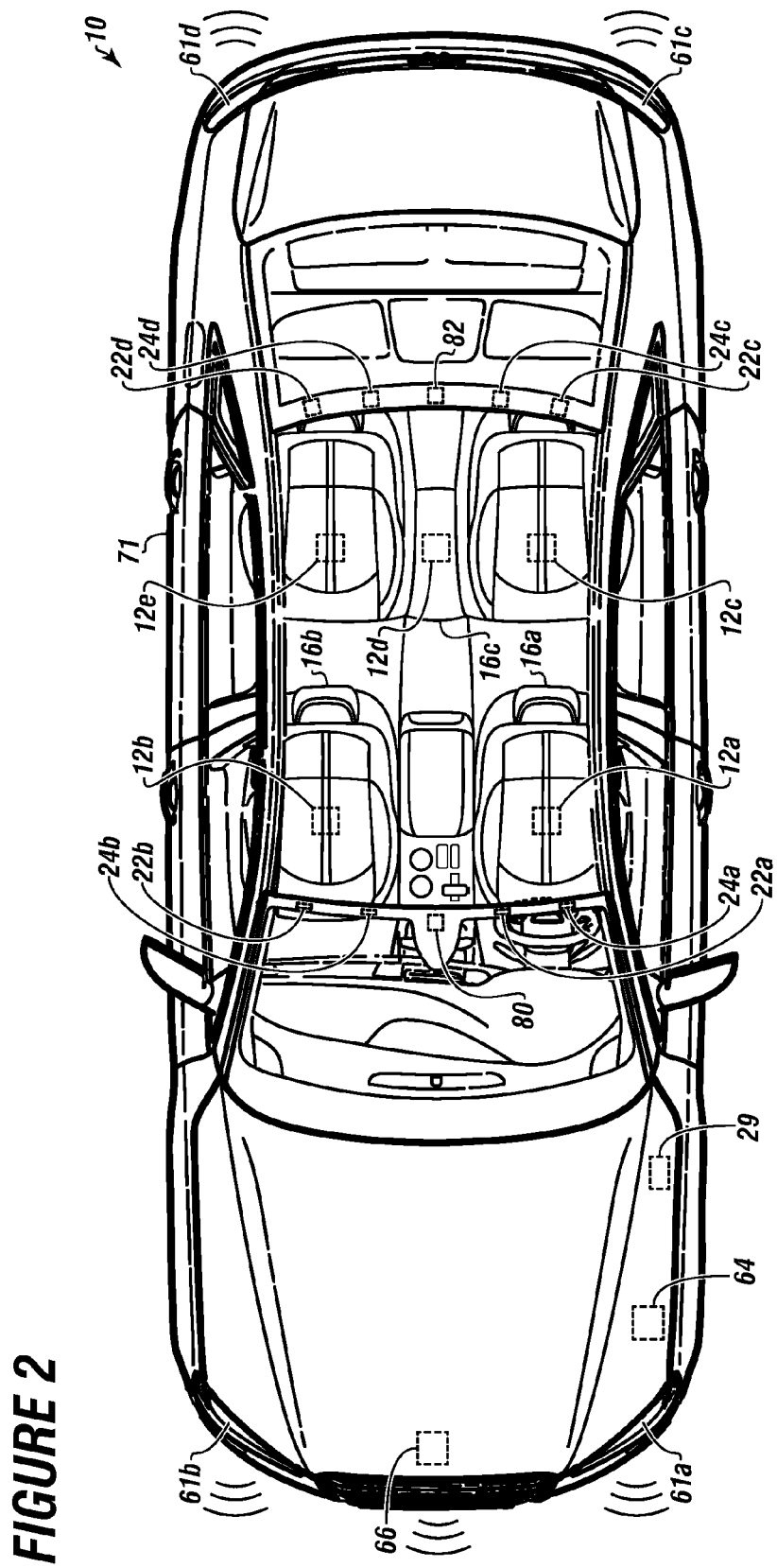
FIG. 2 depicts a top view of the safety system installed in a vehicle according to one or more embodiments.

Turning now to the Figures, FIG. 1 depicts a side view of the safety system installed in a vehicle according to one or more embodiments. FIG. 2 depicts a top view of the safety system installed in a vehicle according to one or more embodiments.

Referring to FIGS. 1 and 2, an occupant 11 is shown left in a parked vehicle. While the occupant shown is a child in a car seat 13, the safety system 10 can be used for any occupant of the vehicle, of any age, in or out of a car seat. The safety system can also be used for animals, such as pets.

The safety system can be used as a reminder to the operator/owner of the vehicle 14 that the inner temperature of the passenger compartment 17 has become too hot or too cold for occupants, such as people or animals, that may have been left in the vehicle.

The safety system 10 can alert others of the presence of the occupant 11 in the passenger compartment 17 of the vehicle 14 subjected to a variable temperature using a client device 97 of an operator connected to a network 31. In embodiments, the safety system can be used with more than one occupant.

Examples of usable networks 31 can include a cellular network, a satellite network, the internet, a local area network, a wide area network, a voice and data global communication system, a similar network known in the industry or combinations thereof.

The safety system 10 can include one or more pressure sensors 12a-12e. Each pressure sensor can be located in one or more vehicle seats 16a-16c. The pressure sensors can be a combination of digital and analog pressure sensors, all analog pressure sensors, or all digital pressure sensors. In embodiments, the pressure sensors can be located in the bottom portions of the vehicle seats.

The safety system 10 can include a plurality of first optical infrared frequency sensors 22a-22d. These first optical infrared frequency sensors can be located in the passenger compartment 17. Each of these first optical infrared frequency sensors can measure air temperature values of the passenger compartment 17 of the vehicle 14.

In embodiments, the first optical infrared frequency sensors can be located on the inside roof of the vehicle. In other embodiments, the first optical infrared frequency sensors can be located in the front dash and in the back of the passenger compartment. The first optical infrared frequency sensors can be placed anywhere in the passenger compartment as long as the first optical infrared frequency sensors can detect the air temperature values in the passenger compartment.

The safety system can include a plurality of second optical infrared frequency sensors 24a-24d located in the passenger compartment 17. Each of the second optical infrared frequency sensors can measure occupant temperature values for an occupant 11 or occupants in the passenger compartment 17 of the vehicle 14.

In embodiments, the second optical infrared frequency sensors can be located on the inside roof of the vehicle. In other embodiments, the second optical infrared frequency sensors can be located in the front dash and in the back of the passenger compartment. The second optical infrared frequency sensors can be placed anywhere in the passenger compartment where the sensors can detect the body temperature of an occupant or occupants.

The safety system 10 can include at least one front seat motion sensor 80 for detecting a front motion indication. The front motion indication indicates movement occurring in the front portion of the passenger compartment. The front seat motion sensor 80 can be located in the front portion of the passenger compartment 17.

The front seat motion sensor 80 can be on the inside roof of the front of the vehicle, in the front dashboard of the vehicle, or anywhere in the front portion of the passenger compartment 17 wherein the front seat motion sensor can detect the movement of an occupant or occupants in the front portion of the passenger compartment 17.

The safety system 10 can include at least one back seat motion sensor 82 for detecting a back motion indication. The back motion indication indicates movement is occurring in the back portion of the passenger compartment. The back seat motion sensor 82 can be located in the back portion of the passenger compartment 17.

The back seat motion sensor 82 can be on the inside roof of the back of the vehicle, at the rear window, or anywhere in the passenger compartment 17 wherein the back seat motion sensor can detect the movement of an occupant or occupants in the back portion of the passenger compartment 17.

The safety system 10 can include a control module 29 in communication with a processor and a data storage. The control module 29 can be in communication with the pressure sensors, the first optical infrared frequency sensors, the second optical infrared frequency sensors, the front seat motion sensor and the back seat motion sensor. The control module 29 can be located anywhere within the vehicle 14. The control module 29 is shown located under the front dashboard.

The control module can include an inside vehicle message transmittal module 91 connected to a dedicated third party response service 93. In embodiments, the inside vehicle message transmittal module can be ON-STAR™ or Chrysler's Access Assist. The inside vehicle message transmittal module can communicate with the network 31.

The control module 29 can communicate using the network 31 and can send an electronic signal to a third party emergency dispatcher 95 or a client device 97 of the operator. The third party emergency dispatcher 95 can be a 911 service such as those connected to police with GPS or another first responder such as a fire department, paramedics, ambulance, or another emergency response company.

In embodiments, the safety system can alert the operator of the vehicle via the client device 97 and generate an alarm using components of the vehicle. The components used to create an alarm can include lights 61a-61d to create a flashing light alarm. Another component used to create an alarm can include a horn 66 to create an audible alarm.

Computer instructions in the data storage can move a vehicle window 73 up or down automatically and slightly, such as 1 inch to 1.5 inches, to allow immediate temperature relief to the passenger compartment and provide immediate temperature relief to the occupant when the alarm is activated by the safety system. Movement of a vehicle window can be a response to the creation of the alarm. The vehicle window can be an electronically operated vehicle window.

The rolling down of the vehicle's windows can be structured as a response to an alarm for high temperatures which is generated by computer instructions in the data storage. If the temperatures are lower than a preset occupant temperature value, then the vehicle window does not roll down.

The data storage can include computer instructions to roll up a vehicle window automatically to allow immediate temperature containment in the passenger compartment when the thermograph shows temperatures are lower than a preset occupant temperature limit. The rolling up of the vehicle window can be structured as a response to an alarm concerning low temperatures which is generated by computer instructions in the data storage. In embodiments, the alarm can include unlocking a vehicle door 71.

The alarm can involve transmitting an electronic signal using the network transmitted to a third party emergency dispatcher 95 or a client device 97 of the operator indicating the occupant's temperature is exceeding or dropping below a life threatening threshold. In embodiments, the control module 29 can transmit an electronic signal from a different transmitter 64 in the vehicle.

Figure 3B:
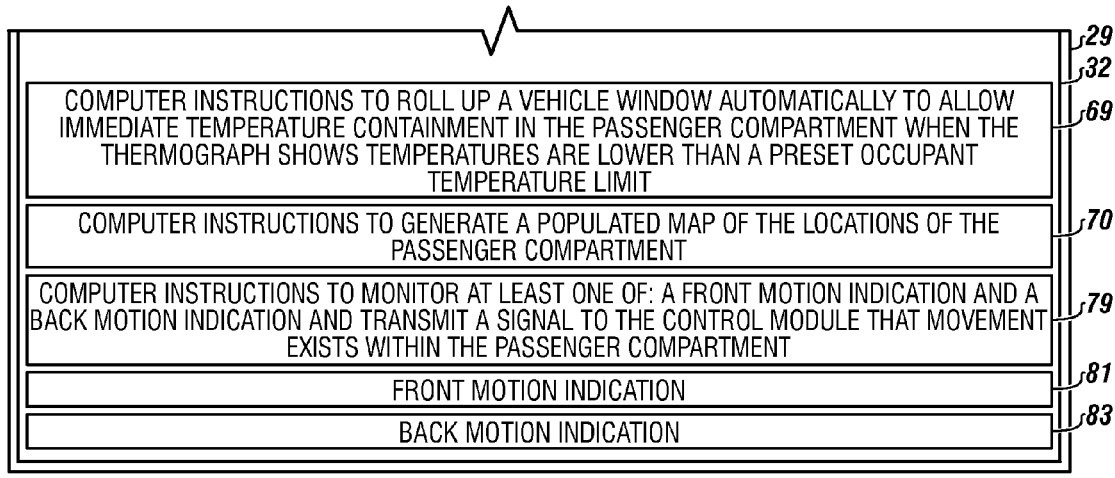

FIGS. 3A-3B depict a diagram of the control module according to one or more embodiments.

The control module 29 can include a processor 30 in communication with a data storage 32.

The control module 29 can continuously receive and store pressure data 45 from the pressure sensors, air temperature values 49 from the plurality of first optical infrared frequency sensors, occupant temperature values 52 from the plurality of second optical infrared frequency sensors, a front motion indication 81 from the front seat motion sensor and a back motion indication 83 from the back seat motion sensor.

The data storage 32 can include preset pressure limits 47.

The data storage 32 can include computer instructions 46 to continuously compare the pressure data from the pressure sensors to stored preset pressure limits to determine if the received pressure data rises above the preset pressure limits, identifying that an object is on a vehicle seat.

The data storage 32 can include computer instructions 48 to receive and store continuously the air temperature values from the plurality of first optical infrared frequency sensors and to receive and store continuously the occupant temperature values from the plurality of second optical infrared frequency sensors. These computer instructions can identify that an occupant is approaching a life threatening temperature.

The data storage 32 can include computer instructions 51 to generate a thermograph based on the air temperature values and the occupant temperature values. The generated thermograph 53 can be stored in the data storage 32.

The data storage 32 can include preset occupant temperature limits 54.

The data storage 32 can include computer instructions 55 to compare continuously the thermograph against the preset occupant temperature limits and identify if the occupant is in danger of extreme temperature exposure.

If the safety system determines that the thermograph is outside the preset occupant temperature limits, the safety system can use computer instructions to generate at least one alarm automatically.

The data storage 32 can include computer instructions 60 to generate automatically at least one alarm when the thermograph is outside the preset occupant temperature limits.

The generated alarm can be an audible alarm using the horn, a flashing light alarm using the lights, the movement of a vehicle window either up or down depending on the detected temperature, unlocking of a vehicle door, transmitting of an electronic signal to a dedicated third party response service, a third party emergency dispatcher, or a client device of the operator, or combinations thereof.

The data storage 32 can include computer instructions 65 to roll down a vehicle window automatically and slightly to allow immediate temperature relief to the passenger compartment and provide immediate temperature relief to the occupant when the thermograph is greater than a preset occupant temperature limit.

The data storage can include computer instructions 69 to roll up a vehicle window automatically to allow immediate temperature containment in the passenger compartment when the thermograph shows temperatures are lower than a preset occupant temperature limit.

The data storage 32 can include a map 40 of the passenger compartment of the vehicle.

The data storage 32 can include locations 41 of the pressure sensors, the first optical infrared frequency sensors, the second optical infrared frequency sensors, the front seat motion sensor, the back seat motion sensor, and combinations thereof.

The data storage 32 can include computer instructions 70 to generate a populated map of the locations of the passenger compartment.

The data storage 32 can include computer instructions 67 to initiate the safety system when the vehicle is turned off.

The data storage 32 can include computer instructions 68 to reset the safety system when the vehicle is turned on.

The data storage 32 can include computer instructions 79 to monitor at least one of: a front motion indication and a back motion indication and transmit a signal to the control module that movement exists within the passenger compartment.

In embodiments, the safety system can transmit the electronic signal as a text message, an email, a tweet, an INSTAGRAM™, a FACEBOOK™ alert, a prerecorded message, or an emergency signal to an emergency system including at least one telephone communication, such as to the 911 operator.

While these embodiments have been described with emphasis on the embodiments, it should be understood that within the scope of the appended claims, the embodiments might be practiced other than as specifically described herein.

What is claimed is:

1. A safety system for alerting of a presence of an occupant in a passenger compartment of a vehicle subjected to a variable temperature to a client device of an operator using a network, the safety system comprising:
    a. a plurality of pressure sensors, each pressure sensor located in a vehicle seat;
    b. a plurality of first optical infrared frequency sensors located in the passenger compartment, wherein each first optical infrared frequency sensor measures air temperature values of the passenger compartment;
    c. a plurality of second optical infrared frequency sensors located in the passenger compartment, wherein each second optical infrared frequency sensor measures occupant temperature values in the passenger compartment; and
    d. a control module connected to the plurality of pressure sensors, the plurality of first optical infrared frequency sensors, and the plurality of second optical infrared frequency sensor, wherein the control module comprises a processor and a data storage in the control module and in communication with the processor, wherein the data storage comprises:
        (i) computer instructions to instruct the processor to continuously compare the pressure data from the pressure sensor to stored preset pressure limits to determine if the received pressure data rises above the preset pressure limits, identifying that an object is on the vehicle seat;
        (ii) computer instructions to instruct the processor to receive and store continuously the air temperature values from the plurality of first optical infrared frequency sensors and to receive and store continuously the occupant temperature values from the plurality of second optical infrared frequency sensors;
        (iii) computer instructions to instruct the processor to generate a thermograph based on the air temperature values and the occupant temperature values;
        (iv) computer instructions to instruct the processor to compare continuously the thermograph against the preset occupant temperature limits, and identify if the occupant is in danger of extreme temperature exposure; and
        (v) computer instructions to instruct the processor to generate automatically at least one alarm when the thermograph is outside the preset occupant temperature limits, wherein the alarm is at least one of:
            1. an audible alarm;
            2. a flashing light;
            3. movement of a vehicle window;
            4. unlocking of a vehicle door;
            5. an electronic signal transmitted to a third party emergency dispatcher; and
            6. an electronic signal transmitted to the client device of the operator.

2. The safety system of claim 1, further comprising a front seat motion sensor for detecting a front motion indication.

3. The safety system of claim 1, further comprising a back seat motion sensor for detecting a back motion indication.

4. The safety system of claim 1, wherein the network is at least one of:
    a. a cellular network;
    b. a satellite network;

c. a voice and data global communication network;
d. a local area network; and
e. a wide area network.

5. The safety system of claim 1, wherein the at least one alarm is transmitted to an inside vehicle message transmittal module connected to a dedicated third party response service via the network.

6. The safety system of claim 1, wherein the third party emergency dispatcher is a 911 service, a first responder, or an emergency response company.

7. The safety system of claim 1, wherein the electronic signal is an text message, an email, a tweet, an INSTAGRAM™, a FACEBOOK™ alert, a prerecorded message, or an emergency signal to an emergency system including at least one telephone number.

8. The safety system of claim 1, wherein the data storage further comprises computer instructions to instruct the processor to initiate the safety system when the vehicle is turned off.

9. The safety system of claim 1, wherein the data storage further comprises computer instructions to instruct the processor to reset the safety system when the vehicle is turned on.

10. The safety system of claim 1, wherein the data storage further comprises:
   a. a map of the passenger compartment;
   b. locations of the plurality of pressure sensors, the plurality of first optical infrared frequency sensors, and the plurality of second optical infrared frequency sensors; and
   c. computer instructions to instruct the processor to generate a populated map of the locations of the passenger compartment on the map.

11. A safety system for alerting of a presence of an occupant in a passenger compartment of a vehicle subjected to a variable temperature to a client device of an operator using a network, the safety system comprising:
   a. a plurality of pressure sensors, each pressure sensor located in a vehicle seat, each pressure sensor adapted for detecting that the vehicle seat is occupied;
   b. a plurality of first optical infrared frequency sensors located in the passenger compartment, each first optical infrared frequency sensor measures air temperature values of the passenger compartment;
   c. a plurality of second optical infrared frequency sensors located in the passenger compartment, wherein each second optical infrared frequency sensor measures occupant temperature values in the passenger compartment;
   d. at least one front seat motion sensor and at least one back seat motion sensor; and
   e. a control module connected to the plurality of pressure sensors, the plurality of first optical infrared frequency sensors, and the plurality of second optical infrared frequency sensors, the front seat motion sensor and the back seat motion sensor, wherein the control module comprises a processor and a data storage in the control module and in communication with the processor, wherein the data storage comprises:
      (i) computer instructions to instruct the processor to continuously compare the pressure data from the pressure sensors to stored preset pressure limits to determine if the received pressure data rises above the preset pressure limits, identifying that an object is on the vehicle seat;
      (ii) computer instructions to instruct the processor to receive and store continuously the air temperature values from the plurality of the first optical infrared frequency sensors and to receive and store continuously the occupant temperature values from the plurality of second optical infrared frequency sensors identifying that the occupant is approaching a life threatening temperature;
      (iii) computer instructions to instruct the processor to generate a thermograph based on the air temperature values and the occupant temperature values;
      (iv) computer instructions to instruct the processor to compare continuously the thermograph against the preset occupant temperature limits, and identify if the occupant is in danger of extreme temperature exposure;
      (v) computer instructions to instruct the processor to:
         1. monitor at least one of:
            a. a front motion indication; and
            b. a back motion indication; and
         2. transmit a signal to the control module that movement exists within the passenger compartment; and
      (vi) computer instructions to instruct the processor to generate automatically at least one alarm when the thermograph is outside the preset occupant temperature limits, wherein the at least one alarm is at least one of:
         1. an audible alarm;
         2. a flashing light;
         3. movement of a vehicle window;
         4. unlocking of a vehicle door;
         5. an electronic signal transmitted to a third party emergency dispatcher indicating the occupant's temperature is exceeding or dropping below a life threatening threshold; and
         6. an electronic signal transmitted to the client device of the operator indicating the occupant's temperature is exceeding or dropping below a life threatening threshold.

12. The safety system of claim 11, wherein the network is at least one of:
   a. a cellular network;
   b. a satellite network;
   c. a voice and data global communication network;
   d. a local area network; and
   e. a wide area network.

13. The safety system of claim 11, wherein the at least one alarm is transmitted to an inside vehicle message transmittal module connected to a dedicated third party response service via the network.

14. The safety system of claim 11, wherein the third party emergency dispatcher is a 911 service, a first responder, or an emergency response company.

15. The safety system of claim 11, wherein the electronic signal is an text message, an email, a tweet, an INSTAGRAM™, a FACEBOOK™ alert, a prerecorded message, or an emergency signal to an emergency system including at least one telephone number.

16. The safety system of claim 11, wherein the data storage further comprises computer instructions to instruct the processor to initiate the safety system when the vehicle is turned off.

17. The safety system of claim 11, wherein the data storage further comprises computer instructions to instruct the processor to reset the safety system when the vehicle is turned on.

18. The safety system of claim 11, wherein the data storage further comprises:
- a. a map of the vehicle passenger compartment;
- b. locations of the plurality of pressure sensors, the plurality of first optical infrared frequency sensors, and the plurality of second optical infrared frequency sensors; and
- c. computer instructions to instruct the processor to generate a populated map of the locations of the passenger compartment on the map.

* * * * *